US009172909B2

(12) United States Patent
Xu et al.

(10) Patent No.: US 9,172,909 B2
(45) Date of Patent: Oct. 27, 2015

(54) PANORAMIC VIDEO CONFERENCE

(71) Applicant: Cisco Technology, Inc., San Jose, CA (US)

(72) Inventors: Guang Xu, Anhui (CN); Dong Zhang, Anhui (CN); Ling Zhu, Anhui (CN); Yongze Xu, Anhui (CN); Ling Zhang, Anhui (CN); Wayne Liu, Anhui (CN)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 14/065,665

(22) Filed: Oct. 29, 2013

(65) Prior Publication Data

US 2015/0116451 A1 Apr. 30, 2015

(51) Int. Cl.
*H04N 7/15* (2006.01)
*H04N 5/232* (2006.01)

(52) U.S. Cl.
CPC ............. *H04N 7/15* (2013.01); *H04N 5/23238* (2013.01)

(58) Field of Classification Search
CPC ............ H04N 7/15; H04N 7/14; H04N 7/152
USPC .................... 348/14.01–14.16; 370/360–361; 709/204
See application file for complete search history.

(56) References Cited

U.S. PATENT DOCUMENTS

| | | | |
|---|---|---|---|
| 8,300,078 B2 | 10/2012 | Lovhaugen et al. | |
| 8,442,043 B2 | 5/2013 | Sharma et al. | |
| 8,531,447 B2 | 9/2013 | Walker et al. | |
| 2006/0158510 A1* | 7/2006 | Lia et al. | 348/14.08 |
| 2008/0016532 A1* | 1/2008 | Wang et al. | 725/45 |
| 2009/0060321 A1* | 3/2009 | Gillard et al. | 382/154 |
| 2012/0297222 A1* | 11/2012 | Lin et al. | 713/320 |
| 2012/0314015 A1 | 12/2012 | Watson et al. | |
| 2012/0317485 A1 | 12/2012 | Ding et al. | |
| 2013/0066623 A1 | 3/2013 | Chou et al. | |
| 2013/0300819 A1* | 11/2013 | Halavy | 348/14.05 |

OTHER PUBLICATIONS

Aditya Mavlankar et al., Video Streaming with Interactive Pan/Tilt/Zoonn, Oct. 2009, High-Quality Visual Experience.

* cited by examiner

*Primary Examiner* — Melur Ramakrishnaiah
(74) *Attorney, Agent, or Firm* — Lempia Summerfield Katz LLC (57) ABSTRACT

In one embodiment, video is transmitted between a sending device and a receiving device. The sending device is configured to receive adjacent camera views and encode the adjacent camera views independently into video streams. The sending device performs an image analysis on the adjacent camera views in order to generate a projection matrix to relate the adjacent camera views. The projection matrix and the encoded video streams are sent to at least one receiver. The receiver is configured to receive the encoded video streams and the projection matrix relating the encoded video streams. The receiver calculates an aggregate video stream using the projection matrix. The aggregate video stream includes portions of at least two of the encoded video streams. Other receivers may receive the same encoded video streams and generate a different aggregate video stream having a varying size, resolution, or number of views.

20 Claims, 11 Drawing Sheets

PANORAMIC VIDEO CONFERENCE

TECHNICAL FIELD

This disclosure relates in general to the field of video delivery, and more specifically, to a panoramic video conference.

BACKGROUND

Video conferencing includes a set of technologies to facilitate two-way audio and video communication between two endpoints or multidirectional communication between more than two endpoints. In some examples, videoconferencing is distinguished from videotelephony in that videotelephony is between individual users and videoconferencing is between multiple users or one or more groups of users.

Videoconferencing often requires specialized equipment. For example, some videoconferencing systems include oversized monitors, dedicated rooms, and/or high bandwidth communication equipment. These types of videoconferencing boardrooms may be very expensive. Simpler systems are less expensive but cannot provide the panoramic views of high end videoconferencing systems.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a sender receives a plurality of adjacent camera views and encodes the views independently as encoded video streams. An image analysis is performed on the plurality of adjacent camera views and a projection matrix is generated to spatially relate the plurality of adjacent camera views. The projection matrix and the encoded video streams are sent to one or more receivers.

In another embodiment, a receiver device receives a plurality of encoded video streams and a projection matrix relating the plurality the encoded video streams. An aggregate video stream is calculated using the projection matrix. The aggregate video stream includes portions of at least two of the plurality of encoded video streams.

Example Embodiments

Panoramic video conferences may be provided by specialized equipment, such as wide angle cameras and large screen displays. Each of the cameras may be permanently mounted for each of the participants in the conference. However, similar experiences may be provided by lower cost equipment. The following embodiments use common cameras and any type of monitor for panoramic video conferences. The common cameras may be the type incorporated into cellular phone, tablet computers, laptop computers, or another mobile device. The common cameras may be web cameras. Multiple common cameras may be arranged to record a wide area such as several people sitting at a board room table. The images collected by the array of cameras are analyzed by a sending endpoint so that the images may be combined into a panoramic image. However, the images may not be combined by the sending endpoint. The images, along with the results of the analysis, are transmitted to one or more receiving endpoints. The receiving endpoints individually combine the images. Thus, the receiving endpoints may provide different images or videos from the same source or sources. The videos may include different portions of the panoramic image. The videos may be displayed in different sizes, resolutions, or other characteristics based on the capabilities of the respective receiving endpoint or of the network of the respective receiving endpoint.

Figure 1:
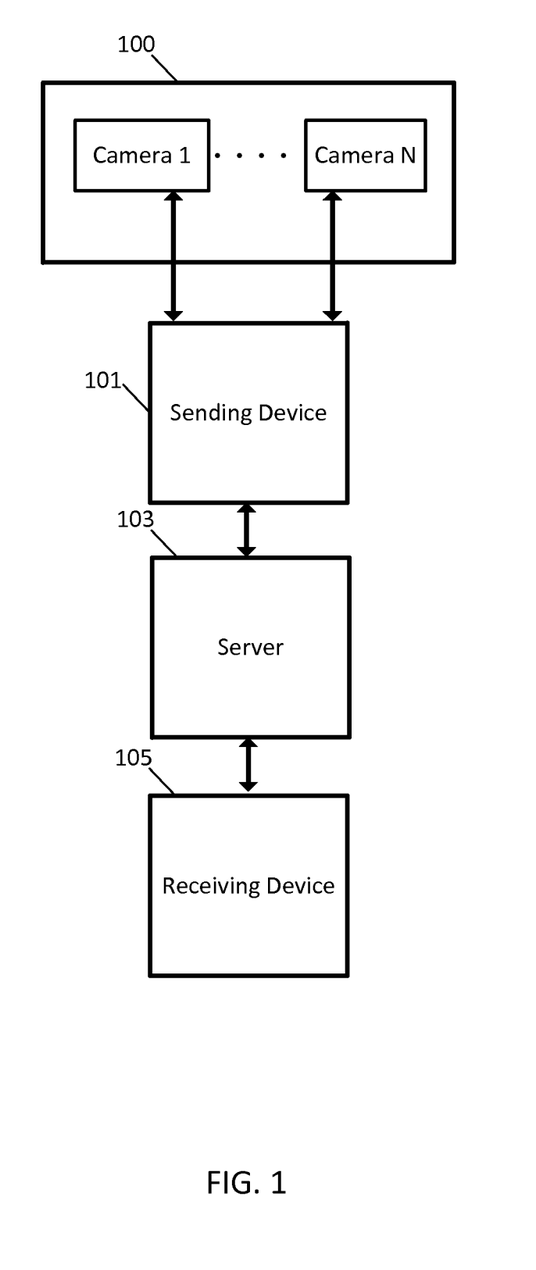
FIG. 1 illustrates an example system for a panoramic video conference.

FIG. 1 illustrates an example system for a panoramic video conference. The system includes a camera array 100, a sending device 101, a server 103, and a receiving device 105. Additional, fewer, or different devices may be included in the system for targeted content video delivery. For example, multiple devices (e.g., routers, firewalls or other enterprise, network, or Internet devices) may be in the communication paths between the sending device 101 and the server 103 or between the receiving device 105 and the server 103.

The camera array 100 may include any number of cameras and/or any number of types of cameras. The cameras may be incorporated into one or more mobile devices. The cameras may be arranged in a predetermined pattern. For example, the cameras may be spaced apart by a specific distance (e.g., 1 meter, 5 feet, 2 meters, or another distance). The cameras may be arranged in an arc having a specified radius. Alternatively, the cameras may be mounted in another predetermined pattern. For example, a wall mount or board may have specific mounting locations for the camera array 100 to align the cameras in an optimal arrangement. In another example, the cameras may be pointed at a series of marks (e.g., cross hairs) on a wall or another surface. The cameras may be configured to display a target or template pattern to align with one of the series of marks. However, the cameras may be positioned in any arrangement as long as adjacent camera views overlap or include a common object that overlaps multiple camera views.

Each of the cameras in the camera array 100 collects a video image. The video images may include a series of frames that form a moving picture when played sequentially. There may be the same or varying numbers of frames per second (e.g., 10 frames per second, 20 frames per second, 30 frames per second, or another value).

The subject matter of the video images may overlap. For example, each of the cameras may be centered on a person sitting at the table. Each of the video images may include a single person or multiple people, but not any of the same people. Each of the video images may also include an object that spans the camera views, such as the table. The image of the table may later be used to align the video images.

The sending device 101 may receive the video images including adjacent camera views from the camera array 100. The sending device 101 is configured to encode the plurality of adjacent camera views independently as encoded video streams. Example protocols include H.323, media gateway control protocol (MGCP), or other protocols. H.323 may be defined according to the international telecommunication union recommendation H.323 "Packet-based multimedia communication systems," as published in December 2009 and available at http://www.itu.int/rec/T-REC-H.323/. MGCP may be defined according to RFC 2805 as published in April 2000 and available at http://tools.ietf.org/html/rfc2805. The protocol, such as H.323, may manage a family of audio, video, and control protocols.

One or more of the plurality of adjacent camera views may be encoded in multiple formats. The multiple formats may vary in size, resolution, number of colors, frame rate, definition type, or another property of the video. Example sizes may be measured in the diagonal size of the display (e.g., 13 inches, 21 inches, 1 meter). Example resolutions may be expressed in the number of pixels (e.g., 1, 5, 10, 50 megapixels) or by the number of lines in each direction (480×720, 1024×968, or another value). Example numbers of color include 1 color, 16 colors, 256 colors, 50,000 colors or 16.7 million colors. Example definition types include standard definition, high definition, or another type of definition. Example protocols for multiple formats include scalable video coding (SVC) or high efficiency video coding (HEVC).

The sending device 101 is also configured to perform an image analysis. The image analysis may be independent of the encoding. The image analysis may be performed on the video streams as received from the camera array 100 or on the encoded video streams. The image analysis may include feature extraction, feature matching, scale invariant feature transform (SIFT), k-dimensional (KD) tree, random sample consensus (RANSAC), or another image processing technique.

$$\begin{bmatrix} x^\lambda \\ y^\lambda \\ z \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} x \\ y \\ 1 \end{bmatrix} \quad \text{Eq. 1}$$

In one example, as shown by Equation 1, the matrix [$m_{00}$, $m_{01}$, $m_{02}$; $m_{10}$, $m_{11}$, $m_{12}$; $m_{20}$, $m_{21}$, $m_{22}$] is the projection matrix. The vector [x, y, 1] is the original position of one point, which is multiplied by the projection matrix to calculate a new position for the point represented by vector [$x^\lambda$, $y^\lambda$, z]. The projection matrix may be calculated through the identification of stitching points or common points between two adjacent images. The translation, rotation, and/or other transformation to align the stitching points are represented by an equation. Multiple equations may be solved or a best estimate solution may be determined and represented as the values of the projection matrix.

The image processing technique may identify features from each of the views. The features may be stored in vectors. The features may include an arrangement of pixels into a shape, a difference in contrast representative of an edge of an object, colors of pixels, or other graphical features. The sending device 101 may compare the vectors of two or more adjacent views in order to identify matching vectors or matching components of the vectors.

The sending device 101 is configured to generate a projection matrix based on the image analysis. The projection matrix relates the adjacent camera views. For example, the projection matrix may include vectors that describe an object common to multiple views. The projection matrix may include a position of an object common to multiple views. The projection matrix may include a positional adjustment to each of the views. The positional adjustments may be in two directions (e.g., X direction and Y direction). For example, the projection matrix may be an N by M matrix in which N is the number of views and M which is the number of dimensions of each view.

In another example, the projection matrix may describe the matching components between vectors of adjacent views. The matching components may be identified based on location within each view. The projection matrix may also include data indicative of a size of the matching components and/or data indicative of the degree of the match between the matching components. The degree of the match may be calculated based on a least square regression.

In another example, the projection matrix may describe a relationship between adjacent views in terms of a transformation to orient a second view to align with a reference view. The transformation may include data for an enlargement, a reduction in size, a rotation, and/or a translation. Enlargement data describes a zoom factor to increase the second view to the same, or approximately the same, scale as the reference view. Reduction data describes a zoom factor to decrease the second view to the same, or approximately the same, scale as the reference view. Rotation data describes an angle to orient the second view with the reference view. Translation data includes a direction and magnitude to linearly move the second view with respect to the reference view in order to align the second view with the reference view.

In another example, the projection matrix 115 may describe stitching points referenced by each camera view. For example, the projection matrix 115 may include stitching location coordinates in each view that specify where an adjacent view should be added together in order two stitch the two views together in a way that minimizes seams and distortions. The projection matrix 115 may include multiple stitching locations for each view that are selected based on the desired size of the aggregate video stream. Any measure or data representing relative position of the images may be used as the projection matrix.

The sending device 101 may transmit the projection matrix and the encoded video streams to the receiving device 105. The video streams and/or projection matrix may be transmitted using real time transport protocol (RTP). RTP may be defined according to RFC 3550, "RTP: A Transport Protocol for Real-Time Applications" as published in July 2003 available at http://tools.ietf.org/html/rfc3550 or another version. The project matrix may be encoded into a control data packet for real time streaming protocol (RTSP). RTSP may be defined according to RFC 2326, Real Time Streaming Protocol, published April 1998 and available at http://tools.ietf.org/html/rfc2326. The projection may be sent via another form of communication (e.g., email, HTTP, file transfer protocol, or another example). The video stream and the projection matrix may be sent together or separate.

The receiving device 105 receives the encoded video streams and the projection matrix that relates the encoded video streams. Based on the projection matrix, the receiving device 105 generates an aggregate video stream including at least two of the video streams. For example, the receiving device 105 may be configured to extract locations values for matching components of adjacent camera views from the projection matrix. The location views are aligned in order to generate the aggregate video stream.

The aggregate video may be in a variety of standard or high definition formats including $3^{rd}$ generation partnership project (3GPP), motion picture experts group (MPEG-4), RTSP, Flash, or another format which may be delivered using RTP or another delivery protocol.

Figure 2:
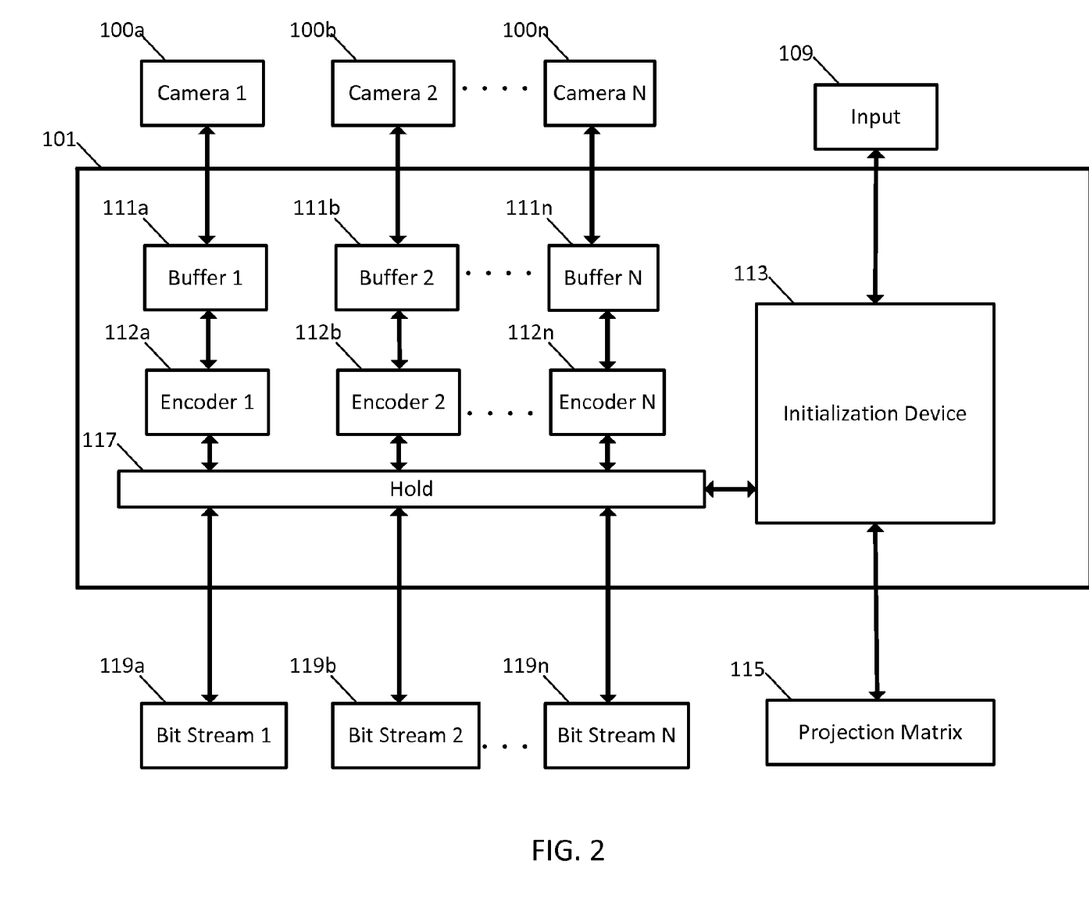
FIG. 2 illustrates an example sending device of the system of FIG. 1.

FIG. 2 illustrates an example sending device 101 of the system of FIG. 1. The sending device 101 is in communication with a set of cameras 100*a-n*. The sending device 101 is also in communication with input 109. The input 109 may be a user input entered from a keyboard, mouse, or another device. The input 109 may be from a motion detector. The sending device 101 includes a set of buffers 111*a*-111*n*, a set of encoders 112*a-n*, an initialization device 113, and a hold (or synchronization) device 117.

The input 109 may trigger an initialization mode for establishing the video stream. The projection matrix 115 may be calculated in the initialization mode by the initialization device 113 in response to the input 109. The input 109 may indicate that the video stream is beginning for the first time or that one of the cameras has been moved. When one of the cameras is moved, any previously calculated projection matrix 115 may no longer be used to effectively combine the adjacent views.

The input 109 may be derived from a motion detector. One or more of the cameras may be associated with a motion detector. The motion detectors may be mounted on the cameras or otherwise physically associated with the cameras in order to detect when any of the cameras have been moved. Example position-based motion detectors include global positioning system (GPS) sensor, an accelerometer, a magnetometer, a gyroscope, or another device. In one example, the motion detector is internal to a mobile device such as a cellular phone. Example optical-based motion detectors include optical sensors, lasers, passive infrared sensors, ultrasonic sensors, microwave sensors, or tomographic sensors.

Each of the cameras 100*a-n* is in communication with one of the set of buffers 111*a-n*. The buffers may receive video frames from the cameras. In one example, the buffers also assign timestamps to the video data. The timestamps may be a time of day, measured from a starting time, or a sequence number for the video data. The buffers may store the video frames until the respective encoder 112*a-n* is ready to receive the video data.

The encoders 112*a-n* are configured to process the video data into video frames according to a video protocol such as RTP, advance video coding (AVC), or H.264/MPEG-4 AVC. H.264/MPEG-4 AVC may be defined according to the joint standard published in May 2003 jointly by the ITU-T Video Experts Coding Group and the Moving Picture Experts Group. The encoders 112*a-n* may send the encoded frames to another set of buffers or out of the sending device 101. In response to forwarding the encoded frames, the encoders 112*a-n* may request additional video data from the buffers 111*a*-111*n*. The encoders may also compress the video data.

The other set of buffers may be embodied as the hold device 117. The hold device 117 is configured to synchronize the video frames received from the encoders 112*a-n*. The hold device 117 is configured to synchronize the video frames based on the timestamps associated with the video frames or based on a hold command from the initialization device 113. Because different video data may require varying amounts of time to encode, video frames from different cameras may arrive at the hold device 112 at different times. The hold device 112 is configured to monitor timestamps and delay video frames when necessary. However, this process may occur at the receiving device 105.

The hold command may be generated at initialization device 113. The hold command may be generated in response to successful calculation of the projection matrix 115. That is, generation or transmission of the hold command may be delayed until time has passed to identify features in the camera views. Alternatively, the hold command may be generated in response to input 109. For example, the hold command may signal the hold device 113 to stop holding or drop data packets until the input 109 indicates that the video stream should be sent to the receiving device 105. The hold device 117 may be omitted.

The output of the hold device 117 includes bit streams 119*a-n*, which are transmitted directly or through a network (e.g., server 103) to the receiving device 105. The components of the sending device 101 may be logical components and not separate components. Any combination of the set of buffers 111*a*-111*n*, the set of encoders 112*a-n*, the initialization device 113, and the hold (or synchronization) device 117 may be embodied as a single controller.

Figure 3:
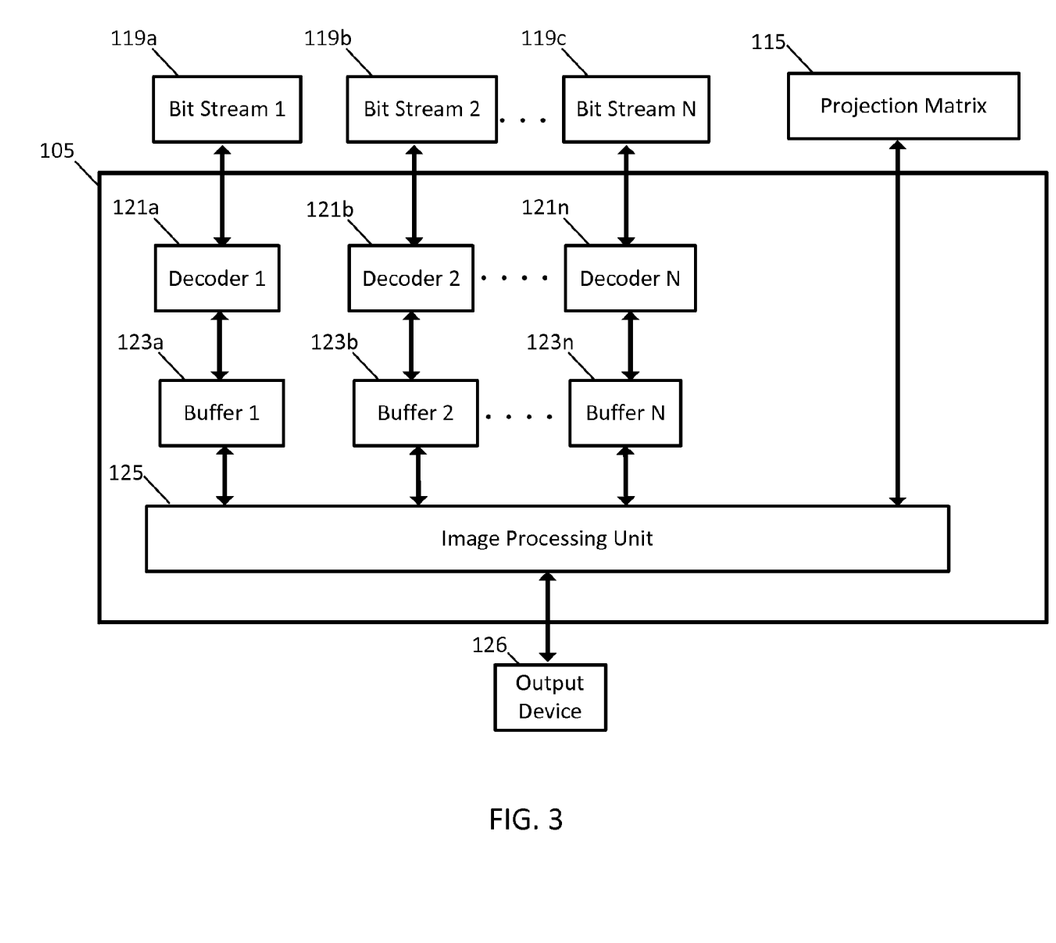
FIG. 3 illustrates an example receiving device of the system of FIG. 1.

FIG. 3 illustrates an example receiving device 105 of the system of FIG. 1. The receiving device 105 includes a set of decoders 121*a-n*, a set of buffers 123*a-n*, and an image processing unit 125. The receiving device 105 is in communication with an output device 126. The receiving device 105 is in communication with the sending device 101 through a network or server 103.

The receiving device 105 receives the bit streams 119*a-n* and projection matrix 115, either directly or through the network or the server 103, from the sending device 101. The bit streams 119*a-n* are sent to separate decoders 121*a-n*. The bit streams include video frames from different cameras and may have different timings (i.e., the video frames of different bit streams are not synchronized in time), resolutions, sizes, or other properties. The decoders 121*a-n* decode and/or decompress the video frames using the same protocol or protocols as their counterpart encoders 112*a-n*.

The buffers 123*a-n* are configured to synchronize the decoded video frames in time. The buffers 123*a-n* extract the timestamps, or sequence numbers, from the video frames. One of the buffers or bit streams may be designated as a reference bit stream and/or reference buffer. The reference buffer stores and holds a video frame. The other buffers besides the reference buffer are configured to store and hold video frames. In one example, the other buffers are configured to store the video frames until all of buffers are full. In another example, the other buffers are configured to hold a video frame within a predetermined time range to the video frame stored in the reference buffer.

The image processing unit 125 receives a set of video frames from the buffers 123*a-n* and the projection matrix 115 from the sending device 101. The image processing unit 125 generates an aggregate video from the video frames using the projection matrix. In one example, the projection matrix 115 includes the coordinates of a first pixel for video frames from bit stream 119*a* and coordinates of a second pixel for video frames from bit stream 119*b*. The projection matrix 115 also includes the coordinates of a third pixel for video frames from bit stream 119*b* and coordinates of a fourth pixel for video frames from bit stream 119*c*. The image processing unit 125 creates the aggregate video stream by stitching video frames based on overlapping the first pixel and the second pixel and overlapping the third pixel and the fourth pixel. Other video processing techniques are possible and discussed below.

The output device 126 receives the aggregate video stream from the image processing unit 125. The output device 126 may be another computing device such as a personal computer, mobile device, cellular phone, personal digital assistant, tablet, or any device with a screen. The output device 126 may be the display itself of the receiving device 105.

Figure 4:
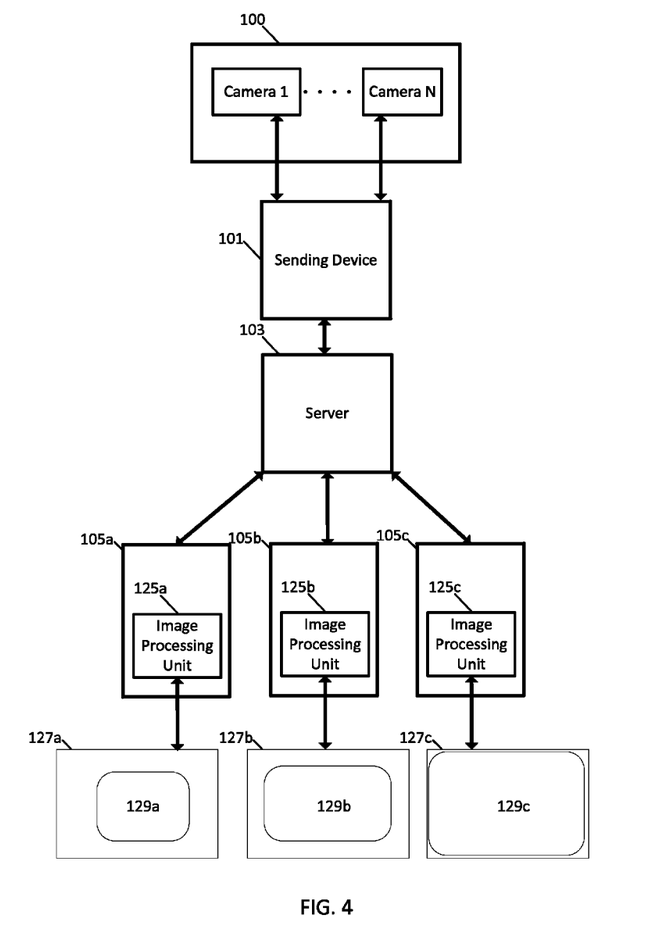
FIG. 4 illustrates another example system for a panoramic video conference with multiple receivers.

FIG. 4 illustrates another example system for a panoramic video conference with multiple receivers. The system includes a camera array 100, a sending device 101, a server 103, and a set of receiving devices 105*a-c*. Each of the receiving devices 105*a-c* includes an image processing unit 125*a-c*. Each of the receiving devices 105*a-c* may incorporate or be connected to one of the displays 127*a-c*.

The various image processing units 125*a-c* may utilize different image processing techniques. The image processing techniques may depend on the resources and hardware available at the respective receiving endpoints.

As shown in FIG. 4, the displays 127*a-c* include viewable areas or screens 129*a-c* of variable sizes. For example, the first viewable area 129*a* is small size, the second viewable area 129*b* is medium sized, and the third viewable area 129*c* is large sized. The image processing units 125*a-c* may stitch together the video based on the size of the viewable areas 129*a-c*. For example, for smaller viewable areas, portions of all of the camera views, or the end camera views, may be removed. The removable portions may be identified in the projection matrix. In another example, the projection matrix 115 may specify multiple stitching locations between adjacent views. One stitching location in each image may be used for the small sized viewable area 129*a*, a second stitching location in each image may be used for the medium sized viewable area 129*b*, and a third stitching location in each image may be used for the large sized viewable area 129*c*.

Figure 5:
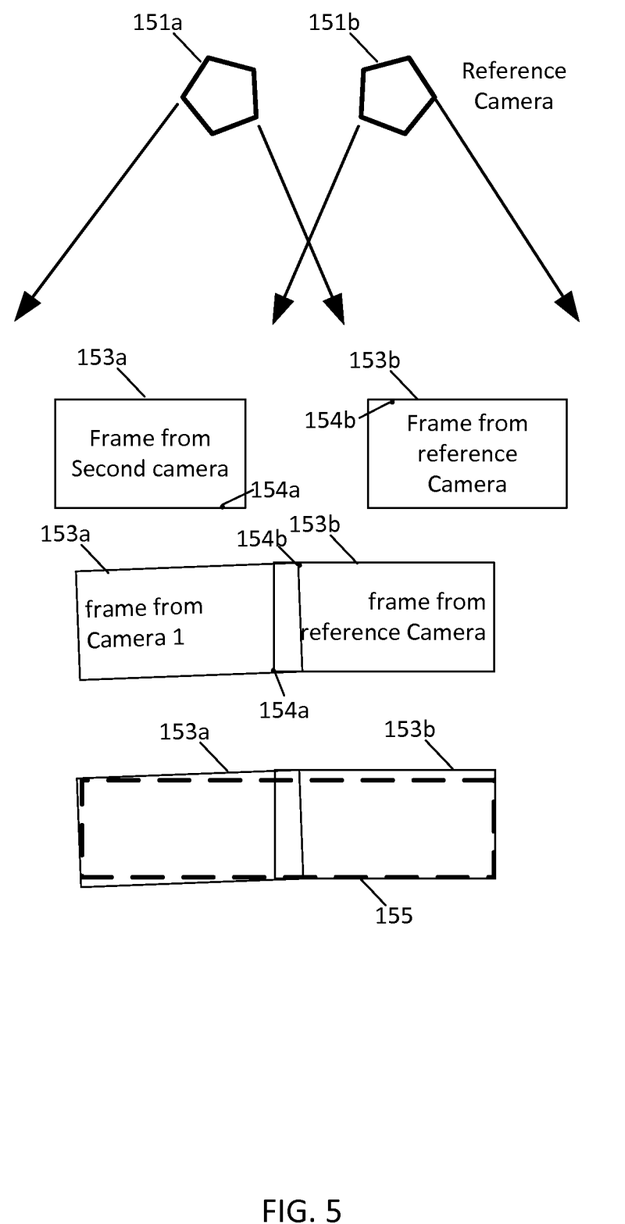
FIG. 5 illustrates an example image synthesis for panoramic video.

FIG. 5 illustrates an example image synthesis for panoramic video. A video of a first view is received from reference camera 151*b* and a video of a second view is received from a second camera 151*a*. The video from the first view includes a series of frames including the frame 153*b* from the reference camera 151*b*, and the video from the second view includes a series of frames including the frame 153*a* from the second camera 151*a*.

The projection matrix may specify one or more stitching points within the frames 153*a-b*. For example, FIG. 5 illustrates a first stitching point 154*b* within the frame 153*b* and a second stitching point 154*a* within the frame 153*a*. The stitching points 154*a-b* specify how the frames 153*a-b* are stitched together. For example, the first stitching point 154*b* indicates where on the frame 153*b* the upper corner of frame 153*a* should be attached, and the second stitching point 154*a* indicates where on the frame 153*a* the lower corner of frame 153*b* should be attached. Alternatively, stitching points may be aligned to each other. Other alignment may be used, such as stitching lines or areas.

Any number of stitching points may be used. For example, when the frames 153*a-b* are parallel (i.e., when the camera views are not at an angle to one another) a single stitching point may be used. In addition, multiple stitching points (e.g., 3, 5, 10, or another number) and an averaging technique may be used to select the stitching points for the aggregate video. The averaging technique may average the deviation between each pair of stitching points with respect to all of the other stitching point pairs. The averaging technique may be a least squares regression algorithm for selecting the best for stitching together two frames based on the available sets of stitching points.

After stitching together two or more frames, the aggregate video may be cropped to select an appropriate viewing shape. The viewing shape may be based on a predetermined size ratio. Example size ratios may be measured by the ratio of horizontal length to vertical length and include 4:3, 16:9, 4:1, 6:1, or other values. The aggregate video stream may be selected to maximize the amount of each of the videos that is included. An example cropped video 155 demonstrates how portions of frames 153*a-b* may be discarded based on the desired shape of the aggregate video. In one example, a first portion of frames 153*a-b* is discarded as a result of stitching the frames 153*a-b* together and a second portion of frames 153*a-b* is discarded as a result of cropping the stitched together frames as a result of the desired shape of the aggregate video.

Figure 6:
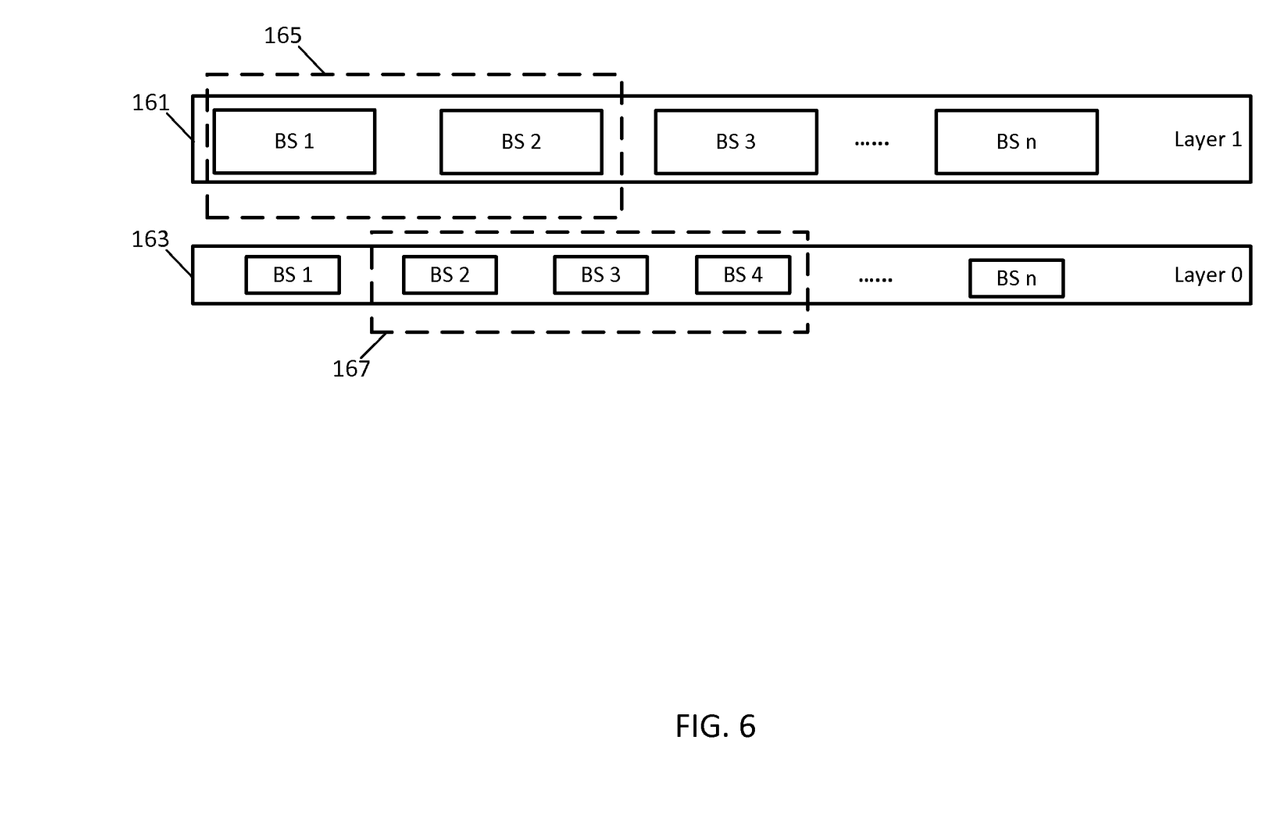
FIG. 6 illustrates an example multilayer bit stream for panoramic video.

FIG. 6 illustrates an example multilayer bit stream for panoramic video. Each of the bit stream 119*a-n* may include multiple layers of video such as a first video layer 161 and a second video layer 163. Each layer of video may be different from other layers by one or more parameters. The parameters may include any combination of resolution, size, color selection, frame rate, or another video parameter. The parameters may include conference parameters. The conference parameters may specify how many other participants are displayed in the aggregate video at a time. The conference parameters may specify the size of the currently speaking participant and a size for the non-speaking participants. The conference parameter may specify how many participants to display at a time. The conference parameters may specify whether or not audio is included in the bit stream. The receiving device may select one or more of the video layers based on a configurable setting, hardware capabilities of the receiving device, or network performance.

Each receiving device may also select a number of bit streams. The number of bit streams may be selected as a function of the size of the display for the receiving device. The number of bit streams may also be selected as a function of the selected video layers. That is, when bandwidth is scarce, higher resolution layers may use fewer bit streams and lower resolution layers may use more bit streams. In another example, the user may actively control the number of participants displayed and accordingly, the number of bit streams requested by the receiving device.

Figure 7:
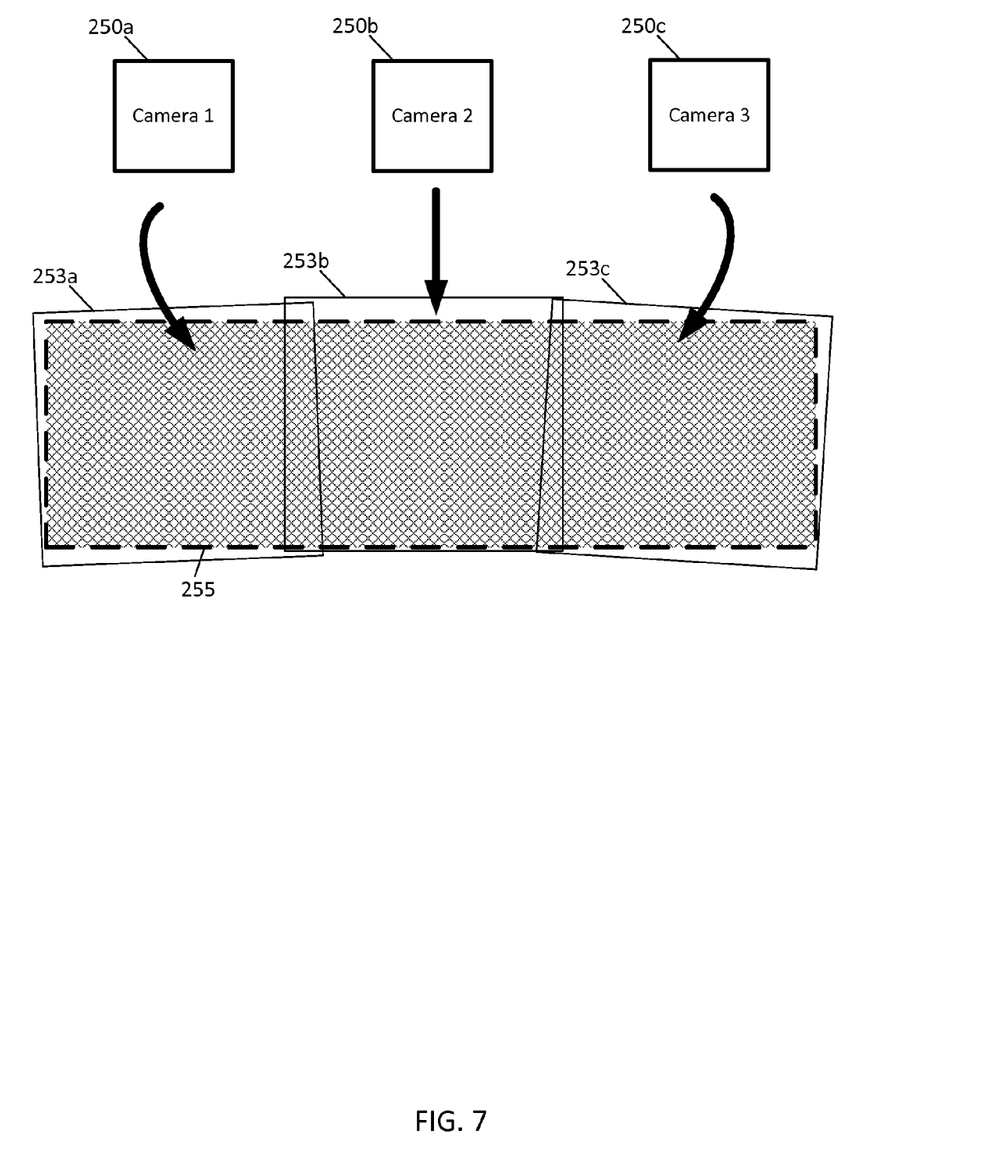
FIG. 7 illustrates another example image synthesis for panoramic video.

FIG. 7 illustrates another example image synthesis for panoramic video using camera views from three cameras 250*a-c*. Three frames 253*a-c* are combined to form an aggregate video frame 255. The three frames 253*a-c* may be combined based on one or more common objects (e.g., a board room table). The projection matrix may include coordinates of the location of the common object through the three frames 253*a-c*. The coordinates of the common object may be used to align the three frames 253*a-c* vertically. Another point of references, such as marks along a table or a background object may be used to align the three frames 253*a-c* horizontally.

After the three frames 253*a-c* are aligned, the receiving device is configured to crop the aggregate video frame 255. The cropped size may be the largest size possible while still preserving the rectangular shape of the aggregate video frame 255 or a predetermined ratio.

Figure 8:
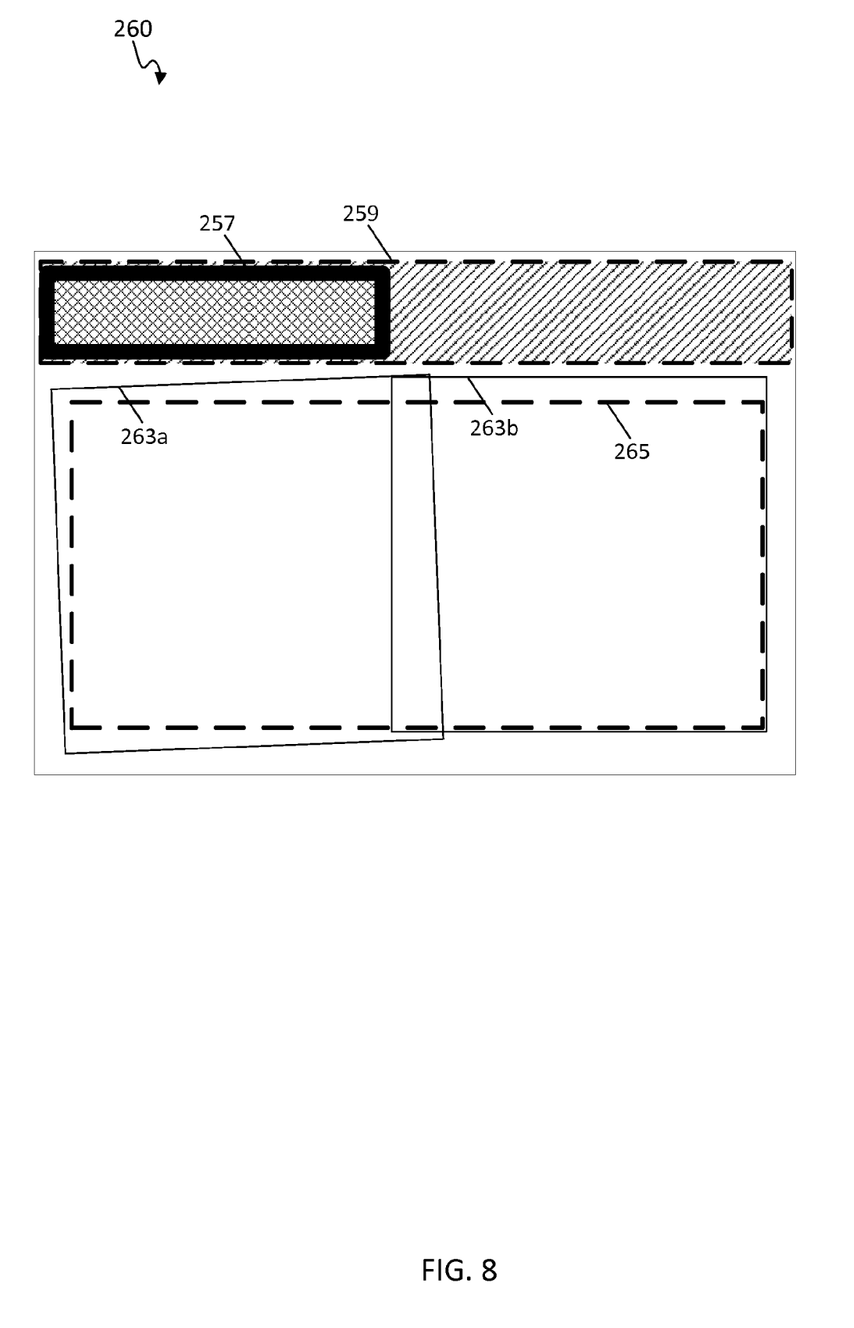
FIG. 8 illustrates an example configurable image synthesis for panoramic video.

FIG. 8 illustrates an example configurable image synthesis for panoramic video. A display 260 on the receiving device 105 may include a user input area for changing the size, shape, or orientation for the aggregate video. In one example, the user input area includes a region selector 257. The region selector 257 may be moved within area 259. The area 259 may be a graphic representation of the entire possible viewable area from all camera views. The region selector 257 is moved within the area 259 to select the area that is shown in the display area 259.

Depending on the position of the region selector 257, a reference frame 263a and a second frame 263b may be stitched together at different locations, or a different number of frames may be used, in order to form an aggregate video frame 265. The receiving device 105 may select the appropriate frames based on the position of the region selector 257. In addition, the receiving device 105 may perform the image synthesis dependent on the position of the region selector. Image fusion may be used to reduce ghosting artifacts from the image synthesis.

Figure 9:
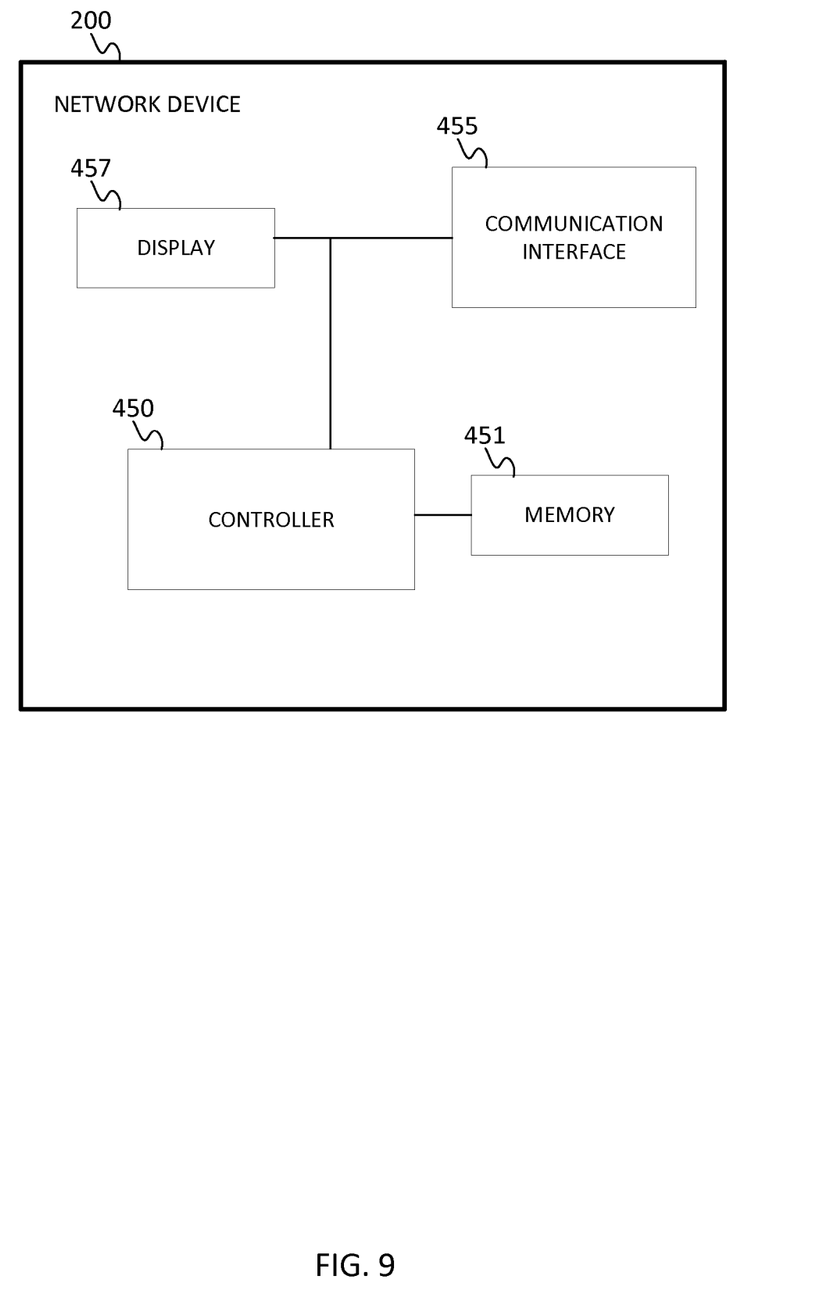
FIG. 9 illustrates an example network device for a system for a panoramic video conference.

FIG. 9 illustrates an example network device 400 for a system for a panoramic video conference. The network device includes at least a memory 451, a controller 450, a communication interface 455, and a display 457. Additional, different, or fewer components may be provided. Different network devices may have the same or different arrangement of components. The network device may correspond to the sending device 101 or the receiving device 105.

Figure 10:
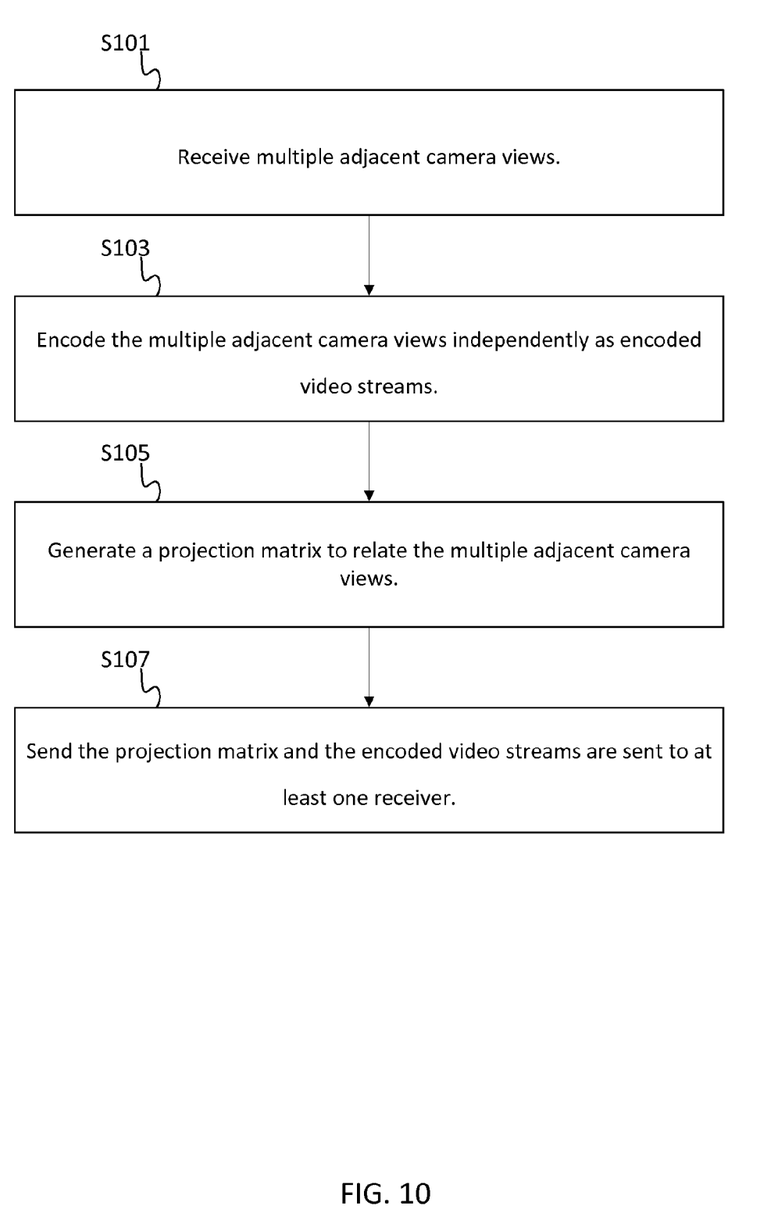
FIG. 10 illustrates an example flow chart for a sending device in a panoramic video conference.

FIG. 10 illustrates an example flow chart for the sending device 101 in the panoramic video conference. Additional, different, or fewer acts may be provided. The acts are performed in the order shown or other orders. The acts may also be repeated.

At act S101, the communication interface 455 receives multiple camera views. At least two of the camera views are adjacent and/or overlapping. The multiple camera views may include any number of views arranged horizontally such that each consecutive pair of views overlap. The multiple camera views may be in various formats. For example, the multiple camera views may be in a raw format received from various cameras. In another example, the multiple camera views are received in different formats and converted by the controller 450.

The data for the video of the camera view may be coupled with data indicative of the characteristics of the camera. The characteristics of the camera may include how many frames per unit time are generated by the individual camera, a resolution of the camera, or another video parameter.

At act S103, the controller 450 encodes the multiple adjacent camera views independently as encoded video streams. The encoding may include data compression. The camera views may be encoded into a predetermined format such as MPEG-4. Each of the camera views may be encoded into a format with multiple layers that vary according to size, resolution, or another factor.

At act S105, the controller 450 generates a projection matrix to relate the adjacent camera views. The projection matrix may be stored in memory 451. The projection matrix may describe features that are common across pairs of adjacent views or across any number of views. The common features may be identified using feature extraction and feature matching. The feature extraction may be performed using SIFT, and the feature matching may be performed using a KD tree algorithm and/or a RANSAC algorithm.

The projection matrix describes multiple arrangements levels of overlap between two or more of the adjacent camera views. For example, the projection matrix may include stitching points where the views are joined together associated with various sizes for the display or viewable areas. At act S107, the communication interface 455 sends the projection matrix and the encoded video streams are sent to at least one receiver.

Figure 11:
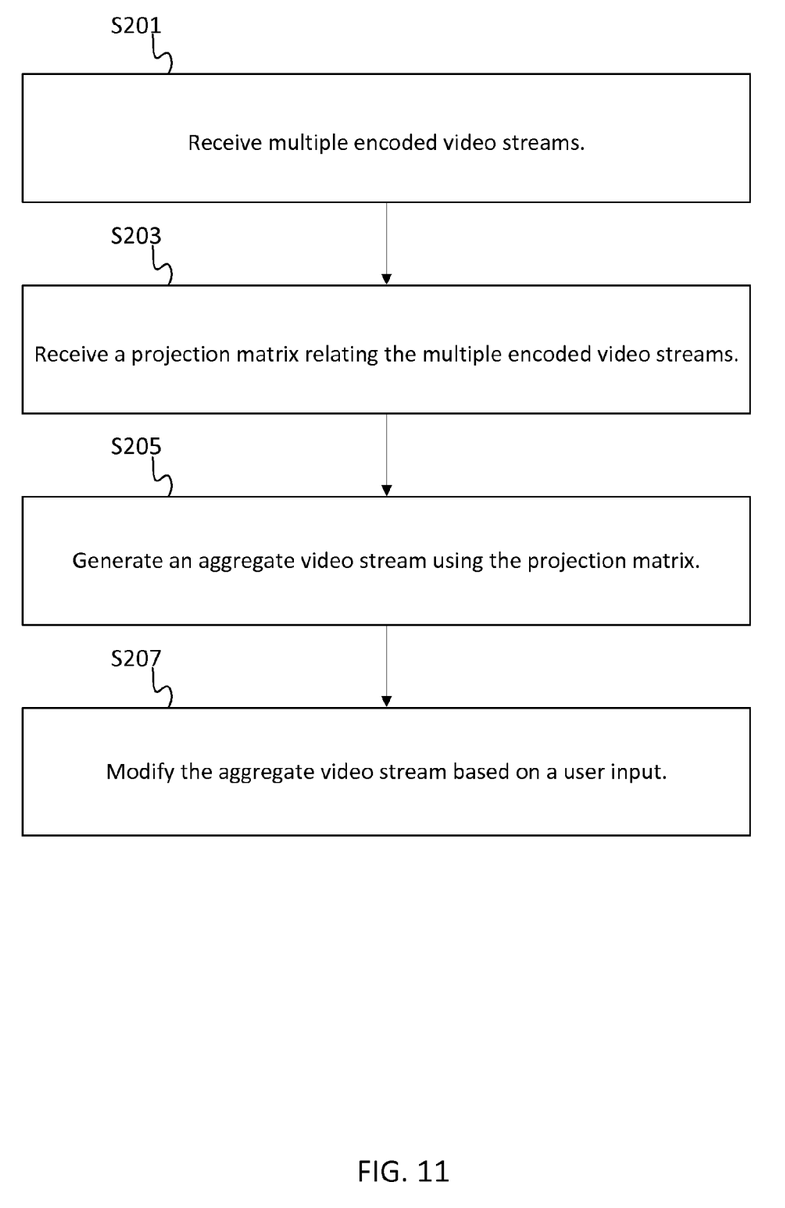
FIG. 11 illustrates an example flow chart for a receiving device in a panoramic video conference.

FIG. 11 illustrates an example flow chart for the receiving device 105 in the panoramic video conference. The receiving device 105 may also be illustrated by network device 400. Additional, different, or fewer acts may be provided. The acts are performed in the order shown or other orders. The acts may also be repeated.

At act S201, the communication interface 455 receives multiple encoded video streams from the sending device 101. At act S203, the communication interface 455 receives a projection matrix relating the multiple encoded video streams. The projection matrix may be stored in memory 451. Acts S201 and S203 may occur at the same time, nearly the same time, or in any order.

At act S205, the controller 450 generates an aggregate video stream using the projection matrix. The aggregate video stream includes portions of at least two of the multiple encoded video streams. However, the aggregate video stream may include any number (e.g., 3, 5, 10, or another number) of encoded video streams. The number of encoded video streams uses in the aggregate video stream and/or the dimensions in pixels or area of the aggregate video stream may be a function of the capabilities of the display 457.

One or more of the receivers may include a configuration file that specifies preferences for the receiver. The configuration file may include a preferred size, a preferred resolution, or a preferred frame rate. In one example, the configuration file may also include multiple sizes, resolutions, or frame rates in an order of preference. If the first choice in the preference list is not available, the second choice is used, and so on. The controller 450 is configured to access the configuration file for one or more preferences and extract stitching points from the projection matrix according to the preferences.

In addition, the configuration file may include a conference setting based on how the participants in the conferences are displayed. For example, the conference setting may specify that only the speaking participant in the conference is shown. In another example, the conference setting may specify one size for the speaking participant and another size for the other participants in the conference. For example, the views of the other (not currently speaking) participants may be scaled to fit half of the viewable area of the display and the view for the currently speaking participant alone is scaled to fit the other half of the viewable area.

At act S207, the controller 450 modifies the aggregate video stream based on a user input. For example, the controller 450 may default to the lowest resolution or smallest sized aggregate video stream available. When a user input is received, the video is improved, if possible, to a desired size. The improvement of the video may be achieved by accessing a different portion of the projection matrix. Alternatively, the video may be improved by selecting a different layer of the bit streams.

In one example, the controller 450 automatically improves the video by accessing a different portion of the projection matrix or selecting successively higher levels of the bit stream as the hardware capabilities (e.g., processing resources) or network capabilities become available. The network capabilities may include bandwidth or a data transfer rate (e.g., 1 megabits per second or 100 kilobytes per second) or a connection type (e.g., 4G, fiber optics, integrated services digital network, WiMAX, or other types).

The controller 450 may include a general processor, digital signal processor, an application specific integrated circuit (ASIC), field programmable gate array (FPGA), analog circuit, digital circuit, combinations thereof, or other now known or later developed processor. The controller 450 may be a single device or combinations of devices, such as associated with a network, distributed processing, or cloud computing.

The memory 451 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface. The display 457 may also include an input device (e.g., touch-screen). The display 457 may include a CRT (cathode ray tube), a LCD (liquid crystal display), or another type of monitor.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium (e.g., memory 451), the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving a plurality of adjacent camera views;
   encoding the plurality of adjacent camera views independently as encoded video streams;
   performing, using a processor, an image analysis on the plurality of adjacent camera views to identify one or more common elements in the plurality of adjacent camera views;
   generating, based on the image analysis, a projection matrix to spatially relate the plurality of adjacent camera views based on the one or more common elements; and
   sending the projection matrix and the encoded video streams to at least one receiver, wherein the projection matrix is configured to allow the at least one receive to align the plurality of adjacent camera views.

2. The method of claim 1, further comprising:
   buffering the encoded video streams, wherein frames of the encoded video streams are associated with timestamps.

3. The method of claim 1, wherein at least one of the encoded video streams includes multiple subset bit streams.

4. The method of claim 3, wherein the subset bit streams vary in display size or resolution.

5. The method of claim 1, further comprising:
   detecting a camera position change, wherein the image analysis is performed in response to the camera position change.
6. The method of claim 1, further comprising:
   receiving an initialization command, wherein the image analysis is performed in response to the initialization command.
7. The method of claim 1, wherein the at least one receiver includes a first receiver and a second receiver, and the projection matrix is configured to facilitate a first combination of the encoded video streams by the first receiver and a second combination of the encoded video streams by the second receiver.
8. The method of claim 1, wherein at least one of the plurality of adjacent camera views is received from a mobile phone.
9. A method comprising:
   receiving a plurality of encoded video streams;
   receiving a projection matrix relating the plurality the encoded video streams; and
   calculating, by a processor, an aggregate video stream using the projection matrix, wherein the aggregate video stream includes portions of at least two of the plurality of encoded video streams.
10. The method of claim 9, further comprising:
    extracting timestamps from the plurality of encoded video streams; and
    correlating the at least two of the plurality of encoded video streams based on the timestamps.
11. The method of claim 9, further comprising:
    selecting a subset of the plurality of encoded video streams based on a video parameter, a conference parameter, or a region selector.
12. The method of claim 11, wherein the video parameter specifies any combination of a resolution, a display ratio, or a definition type of the video.
13. The method of claim 11, wherein the conference parameter specifies a number of participants to display or a size to display for one or more participants.
14. The method of claim 11, wherein the region selector is a movable graphic that specifies a subset of the encoded video streams by area.
15. The method of claim 9, wherein the projection matrix specifies one or more stitching points for the plurality the encoded video streams.
16. An apparatus comprising:
    a communication interface configured to receive a plurality of adjacent camera views; and
    a controller configured to encode the plurality of adjacent camera views independently as encoded video streams and generate a projection matrix including positional adjustments to align the plurality of adjacent camera views,
    wherein the projection matrix and the encoded video streams are sent to at least one receiver.
17. The apparatus of claim 16, wherein at least one of the encoded video streams includes multiple subset bit streams, and the multiple subset bit streams vary in display size or resolution.
18. The apparatus of claim 17, wherein the projection matrix allows the subset bit streams to be stitched together in different patterns depending on preferences of the at least one receiver.
19. An apparatus comprising:
    a communication interface configured to receive a plurality of encoded video streams and a projection matrix including positional adjustments to align the plurality of encoded video streams; and
    a controller configured to generate an aggregate video stream using the projection matrix, wherein the aggregate video stream includes portions of at least two of the plurality of encoded video streams.
20. The apparatus of claim 19, wherein the controller is configured to select a subset of the plurality of encoded video streams for a desired size for the aggregate video stream, wherein the desired size is based on one or more of a user input, hardware capabilities, and conference parameters.

* * * * *